(12) United States Patent
Koide

(10) Patent No.: US 6,594,256 B1
(45) Date of Patent: Jul. 15, 2003

(54) COMMUNICATION APPARATUS

(75) Inventor: Atsuko Koide, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/468,121

(22) Filed: Dec. 21, 1999

(30) Foreign Application Priority Data

Dec. 22, 1998 (JP) .......................................... 10-363678

(51) Int. Cl.⁷ ................................................ H04L 12/66

(52) U.S. Cl. ....................................... 370/352; 370/410

(58) Field of Search .................................. 370/351–356, 370/395.52, 412, 410, 464–467, 521, 427, 426; 379/229, 230

(56) References Cited

PUBLICATIONS

International Telecommnication Union; *Itu–T Recommendation H.245*; "Control Protocol For Mulitmedia Communication"; Feb. 6, 1998; pp 1–238.

*Primary Examiner*—Ajit Patel
*Assistant Examiner*—Raj Jain
(74) *Attorney, Agent, or Firm*—Rabin & Berdo, P.C.

(57) ABSTRACT

An object of the present invention is to achieve reliable transfer of DTMF signals by preventing the DTMF signals from being doubly received by a receiver due to the DTMF signals being transferred as sound signals to the receiver through a channel for call when transferring the DTMF signals through a channel for control. A communication apparatus in accordance with the present invention is configured to send out a silence to the channel for call when a DTMF signal is transferred so as to prevent the DTMF signal from being sent out as a sound signal onto the channel for call. Furthermore, the communication apparatus is also configured to delete a DTMF signal stored in an FIFO to thereby prevent the DTMF signal from being sent out onto the channel for call.

18 Claims, 6 Drawing Sheets

COMMUNICATION APPARATUS

BACKGROUND OF THE INVENTION

1. Field of the Invention

The present invention relates to a communication apparatus and, more particularly, to a communication apparatus for transferring dual tone multi-frequency (DTMF) signals, facsimile answer tone signals, etc. in performing communication by using packeted sound signals.

2. Description of the Related Art

Integration of a speech network such as a telephony network and a signal network such as a LAN has been achieved by the Internet or other wide-area computer networks, and is being put in practical use as an Internet telephone service. The Internet is based on packet switching. Each packet selectively passes through a plurality of computers and networks by routing until it reaches its target counterpart.

The Internet has been achieving its development based mainly on protocols generally referred to as transmission control protocol/Internet protocol (TCP/IP), the Internet protocol (IP) being the core. The IP is a connectionless protocol based on a signal program, and guarantees nothing about the time required for signals to reach or sequence of signals. In the TCP/IP, therefore, a transport protocol class is specified separately from the IP. The transport protocols of the TCP/IP include a transmission control protocol (TCP) and a user datagram protocol (UDP). The TCP is a connection type protocol for accomplishing highly reliable byte stream transfer, and finds its applications in transfer of mail or files, remote login protocols, etc. The UDP is a low-reliability datagram protocol and does not guarantee perfection. On the other hand, the UDP permits flexible, highly efficient signal transfer for some applications or network environments because it requires no virtual circuit to be established and involves no fixed paths for signal transfer.

The Internet is generally configured by first configuring a local area network (LAN) in a company, then connecting the LAN to the Internet. Normally, when using the Internet or a network such as a LAN and packeting speeches to perform communication, sound signals are converted into UDP packets and sent out onto a channel for call of a network. Control signals are converted into TCP packets and sent out onto a channel for control of the network.

Regarding DTMF signal transfer, the ITU-T Recommendation H. 245 specified a method for converting DTMF signals into TCP packets and sending them out onto a channel for control.

The DTMF signals, however, are transferred through the channel for control and also passed as sound signals through a channel for speech at the same time. A receiver, therefore, receives the DTMF signals from both the channel for control and the channel for speech, causing erroneous detection to take place.

SUMMARY OF THE INVENTION

Accordingly, an object of the present invention is to achieve reliable transfer of DTMF signals by preventing the DTMF signals from being doubly received by a receiver due to the DTMF signals being transferred as sound signals to the receiver through a channel for call when transferring the DTMF signals through a channel for control.

To this end, according to one aspect of the present invention, there is provided a communication apparatus for sending out a first signal included in an input signal onto a channel for call and sending out a second signal included in the input signal onto a channel for control, the communication apparatus comprising: a first signal transmitting module that temporarily stores the input signal and transmits the input signal onto the channel for call; a second signal transmitting module that transmits a signal supplied to an input terminal onto the channel for control; an FIFO control module that deletes the second signal already stored in the first signal transmitting module when a signal is supplied to the input terminal; and a signal control module that detects whether the input signal is the second signal or not, transmits a third signal that corresponds to silence to the first signal transmitting module in place of the input signal while detection of the second signal is being implemented, and transmits the second signal to the input terminal when the second signal has been detected.

The signal control module comprises a signal detective module that detects whether the input signal is the second signal or not, sends out an instruction signal and also transmits the second signal to the second signal transmitting module and the FIFO control module when the second signal has been detected, and sends out the instruction signal again when the detection of the second signal is completed; a third signal generating module that generates the third signal that corresponds to silence; and a third signal control module that carries out control so that the third signal is transmitted to the first signal transmitting module in place of the input signal until the instruction signal is received again after the instruction signal is first received.

The third signal control module cuts off a first channel that leads the input signal to the first signal transmitting module, and connects a second channel to the first signal transmitting module from the third signal generating module to thereby conduct control so that the third signal is transmitted in place of the input signal to the second signal transmitting module.

The first signal transmitting module comprises a signal compressing module that compresses the input signal and outputs the compressed signal, a UDP packet control module that converts the compressed signal into a UDP packet and outputs the UDP packet, and an FIFO that stores the UDP packet as the input signal for a predetermined time before transmitting it to the channel for call.

The second signal transmitting module converts the second signal into a TCP packet and transmits the converted second signal to the channel for control.

The FIFO control module goes back for a predetermined time from a point where a signal was supplied to the input terminal, and deletes the second signal already stored in the first signal transmitting module.

The predetermined time means an adequate time that has been set by taking into account a delay time in processing by the communication apparatus and that is sufficiently long to delete the second signal already stored in the first signal transmitting module. Furthermore, the predetermined time means a time during which the input signal is sent out from a terminal connected to the communication apparatus and the second signal is supplied to the input terminal.

According to another aspect of the present invention, there is provided a communication apparatus for sending out a first signal included in an input signal onto a channel for call and sending out a second signal included in the input signal onto a channel for control, the communication apparatus comprising: a signal compressing module that compresses the input signal and outputs the compressed signal; a UDP packet control module that converts the compressed signal into a UDP packet and outputs the UDP packet; an FIFO that stores the UDP packet as the input signal for a predetermined time, then transmits the UDP packet to the channel for call; a TCP packet control module that converts the second signal into a TCP packet and transmits the converted second signal to the channel for control; an FIFO control module that deletes the second signal already stored in the first signal transmitting module when a signal is supplied to the input terminal; a signal detective module that detects whether the input signal is the second signal or not and sends out an instruction signal and also transmits the second signal to the TCP packet control module and the FIFO control module when the second signal has been detected, and sends out an instruction signal again when the detection of the second signal is completed; a silence generating module that generates a signal corresponding to a silence; and a silence sending module that carries out control so that the signal corresponding to silence is transmitted, in place of the input signal, to the signal compressing module until the instruction signal is received again after the instruction signal is received once.

The silence sending module cuts off a first channel that leads the input signal to the signal compressing module, and connects a second channel to the signal compressing module from the silence generating module to thereby conduct control so that the signal corresponding to silence is transmitted in place of the input signal to the signal compressing module.

The FIFO control module goes back for a predetermined time from a point where a signal is supplied to the input terminal, and deletes the second signal already stored in the first signal transmitting module.

The predetermined time means an adequate time that has been set by taking into account a delay time in processing by the communication apparatus and that is sufficiently long to delete the second signal already stored in the first signal transmitting module. Furthermore, the predetermined time means a time during which the input signal is sent out from a terminal connected to the communication apparatus and the second signal is supplied to the input terminal.

According to yet another aspect of the present invention, there is provided a communication apparatus for sending out a first signal included in an input signal onto a channel for call and sending out a second signal included in the input signal onto a channel for control, the communication apparatus comprising: a signal compressing module that compresses the input signal and outputs the compressed signal; a UDP packet control module that converts the compressed signal into a UDP packet and outputs the UDP packet; an FIFO that stores the UDP packet as the input signal for a predetermined time, then transmits the UDP packet to the channel for call; a TCP packet control module that converts the second signal into a TCP packet and transmits the converted second signal to the channel for control; an FIFO control module that deletes the second signal already stored in the first signal transmitting module when a signal is supplied to the input terminal; a signal detective module that detects whether the input signal is the second signal and sends out an instruction signal and also transmits the second signal to the TCP packet control module and the FIFO control module when the second signal has been detected, and sends out an instruction signal again when the detection of the second signal is completed; a path control module that cuts off a first channel that leads to the signal compressing module for a period of time from the moment the input signal is received to the moment the instruction signal is received again; a silence generating module that generates a signal corresponding to a silence; and a silence sending module that transmits a signal corresponding to a silence, in place of the compressed signal, to the UDP packet control module for a period of time from the moment the instruction signal is received to the moment the instruction signal is received again.

The silence sending module creates the signal corresponding to silence, cuts off a second channel that leads to the UDP packet control module from the signal compressing module, and connects a third channel that leads to the UDP packet control module from the silence sending module so as to carry out control to transmit the signal corresponding to silence to the UDP packet control module in place of the compressed signal.

The FIFO control module goes back for a predetermined time from a point where a signal was supplied to the input terminal, and deletes the second signal already stored in the first signal transmitting module.

The predetermined time means an adequate time that has been set by taking into account a delay time in processing by the communication apparatus and that is sufficiently long to delete the second signal already stored in the first signal transmitting module. Furthermore, the predetermined time means a time during which the input signal is sent out from a terminal connected to the communication apparatus and the second signal is supplied to the input terminal.

DESCRIPTION OF THE PREFERRED EMBODIMENTS

Embodiments of the present invention will be described in detail.

Figure 1:
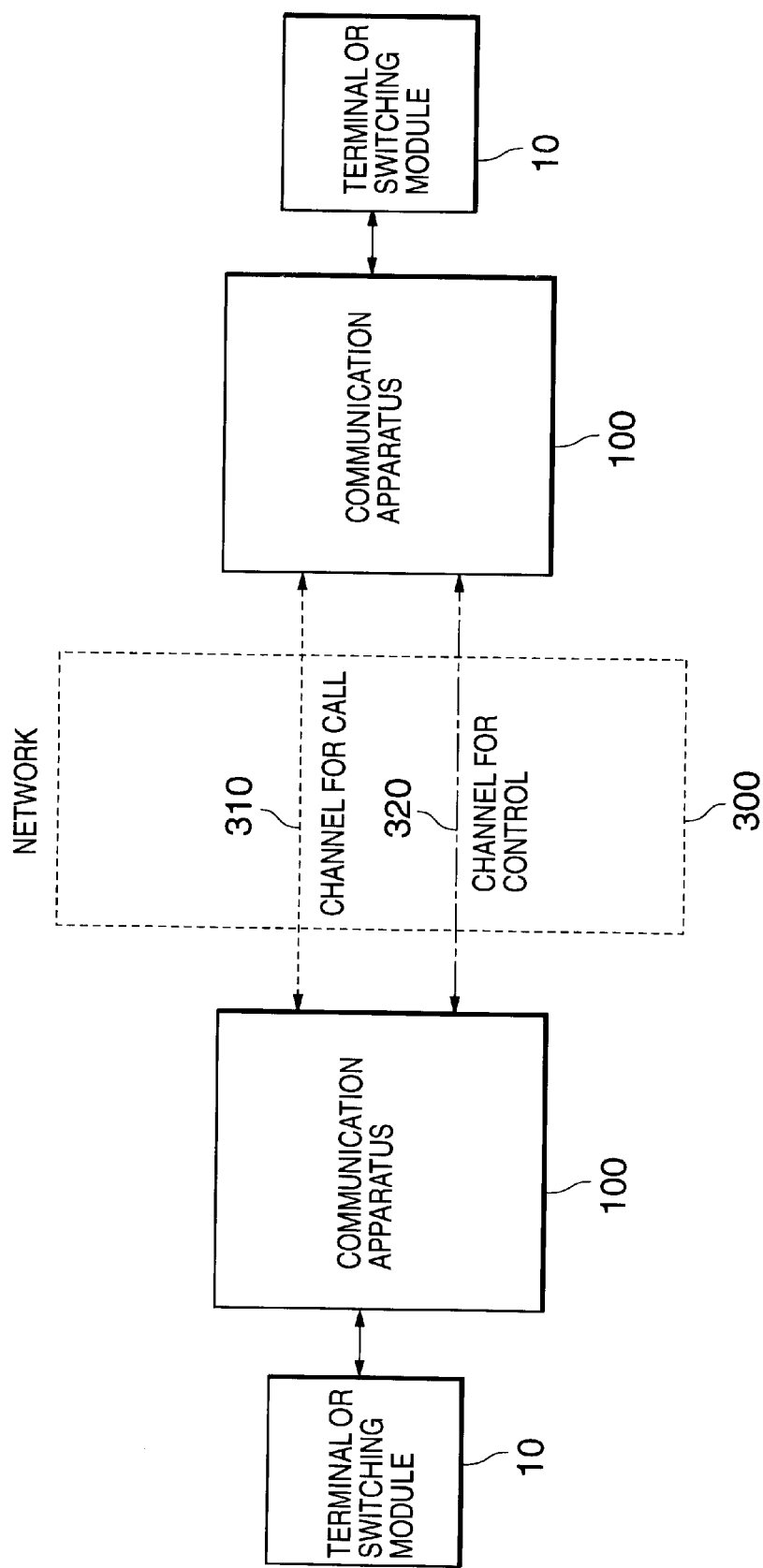
FIG. 1 is a block diagram showing an example of a network configuration using the present invention.

FIG. 1 is a block diagram showing an example of a network configuration employing the present invention.

A terminal 10 is connected to a communication apparatus 100, the communication apparatus 100 being connected to a network 300. A signal sent out from the terminal 10 is transferred to the network 300 by the communication apparatus 100, passed through the communication apparatus 100 of a receiver, and received by the terminal 10 of the receiver.

The terminal 10 is, for example, a key telephone system, a facsimile, a switching module, or the like. The terminal 10 sends out roughly two types of signals. One type of signals includes regular sound signals such as conversation voice. The other type of signals includes special sound signals such as DTMF signals and facsimile answer tone signals. These signals are also sound signals; however, unlike regular sound signals, they have predetermined meanings. A DTMF signal is a signal wherein a numeral or a symbol is assigned to a combination of two sounds. For instance, when "1" is dialed on a key telephone system, a sound of a combination of frequencies of 1209 Hz and 697 Hz is sent out as a DTMF signal.

The communication apparatus 100 is an apparatus for transmitting and receiving packeted sound signals. An example of the communication apparatus is a VOIP gateway apparatus.

The network 300 is a network such as the Internet, a LAN, or the like used for transferring signals. The network 300 has a channel for call 310 and a channel for control 320. Regular sound signals are sent out in the form of UDP packets on the channel for call 310 to the network 300. Control signals are sent out in the form of TCP packets on the channel for control 320 to the network 300. The DTMF signals and facsimile answer tone signals are also transmitted through the channel for control 320 as signals different from sound signals.

Figure 2:
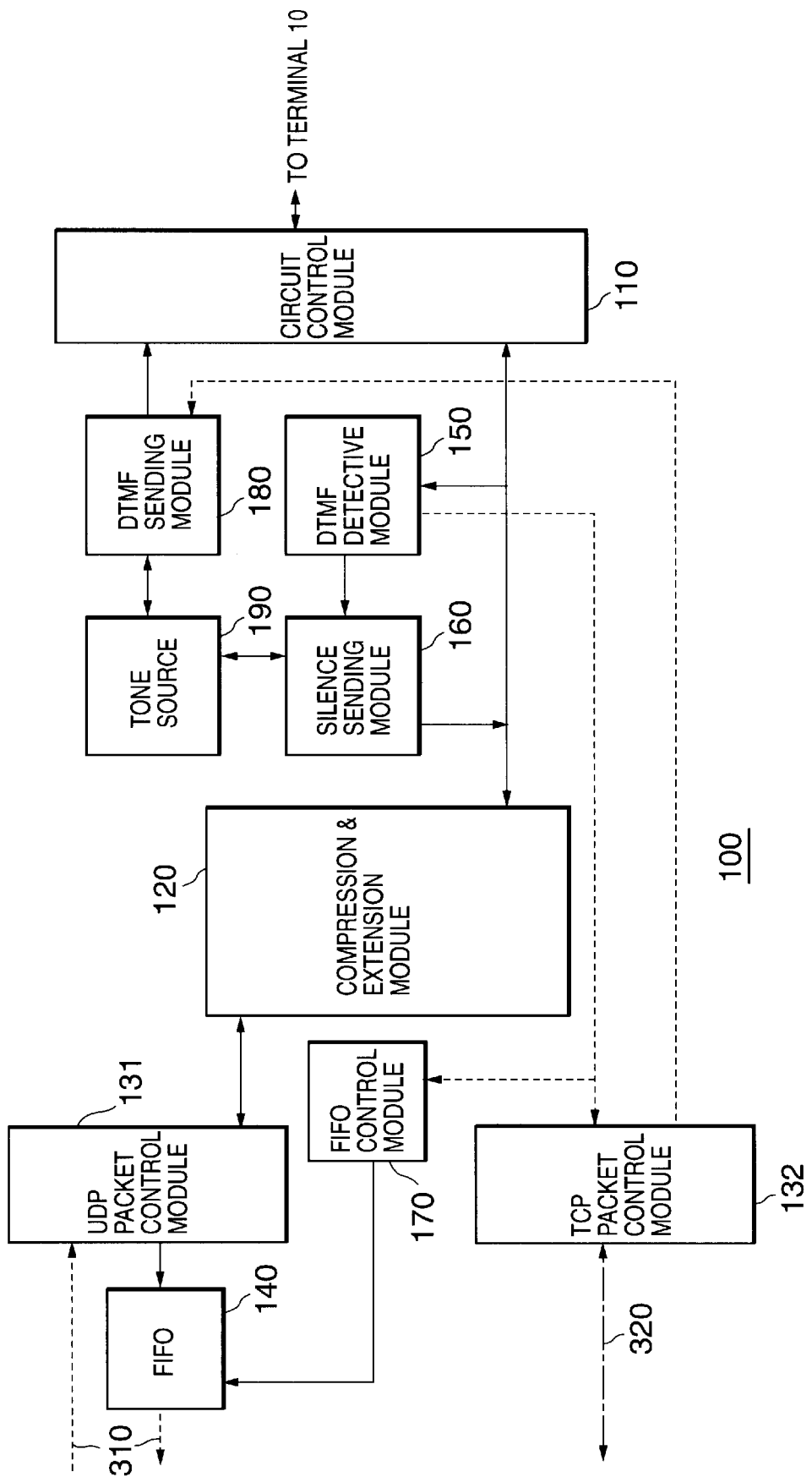
FIG. 2 is a block diagram showing a first embodiment of a communication apparatus in accordance with the present invention.

FIG. 2 shows, as a first embodiment of the present invention, a configuration of a communication apparatus that transfers DTMF signals.

Referring to FIG. 2, a communication apparatus 100 is a VOIP gateway apparatus for transmitting and receiving packeted sound signals.

The communication apparatus 100 is constituted by a circuit control module 110, a compression and extension module 120, a UDP packet control module 131, a TCP packet control module 132, a first-in-first-out (FIFO) 140, a DTMF detective module 150, a silence sending module 160, an FIFO control module 170, a DTMF sending module 180, and a tone source 190.

The compression and extension module 120, the UDP packet control module 131, and the FIFO 140 make up a first signal transmitting unit. The TCP packet control module 132 corresponds to a second signal transmitting unit. The DTMF detective module 150, the silence sending module 160, and the tone source 190 make up a signal control unit.

The circuit control module 110 carries out circuit control of conversion between pulse code modulation (PCM) signals and analog signals. The circuit control module 110 converts analog signals sent out from a terminal 10 into PCM signals and send out the PCM signals to the DTMF detective module 150 and the compression and extension module 120. The circuit control module 110 also converts PCM signals sent out from the DTMF sending module 180 into analog signals and sends out the analog signal to the terminal 10.

The compression and extension module 120 compresses PCM signals and restores or extends compressed signals. The compression and extension module 120 also compresses PCM signals and restores compressed signals.

The UDP packet control module 131 and the TCP packet control module 132 control transmission and receipt of packets. The UDP packet control module 131 creates a UDP packet, temporarily stores the created packet, then transmits it to the channel for call 310. The UDP packet control module 131 also receives UDP packets transmitted via the channel for call 310. The TCP packet control module 132 creates a TCP packet and transmits it to the channel for control 320, and it also receives a TCP packet transmitted via the channel for control 320.

The FIFO 140 is a buffer for temporarily holding signals to output them in sequence. The FIFO 140 employs, for example, a flip-flop or a D-latch that is able to operate at fast speed.

The DTMF detective module 150 sends out an instruction signal to the silence sending module 160 when a DTMF signal has been detected, and also converts the detected DTMF signal to send it out to the TCP packet control module 132 and the FIFO control module 170. For instance, when the DTMF detective module 150 detects that a transmitted DTMF signal corresponds to a numeral "1", then it converts the signal carrying the sound information into an information signal denoted by "1". Hereinafter, in order to distinguish between unconverted DTMF signals and converted DTMF signals, the unconverted DTMF signals will be referred to simply as "DTMF signals" and the converted DTMF signals will be referred to as "DTMF information signals."

The silence sending module 160 cuts off a channel from the circuit control module 110 to the compression and extension module 120 in response to an instruction signal received from the DTMF detective module 150, and connects a channel from the silence sending module 160 to the compression and extension module 120.

The FIFO control module 170 clears a packet stored in the FIFO 140 upon receipt of the DTMF information signal.

The DTMF sending module 180 reads a tone that corresponds to a received DTMF information signal from the tone source 190 where diverse types of tones are stored, and sends out the tone to the circuit control module 110.

Figure 3:
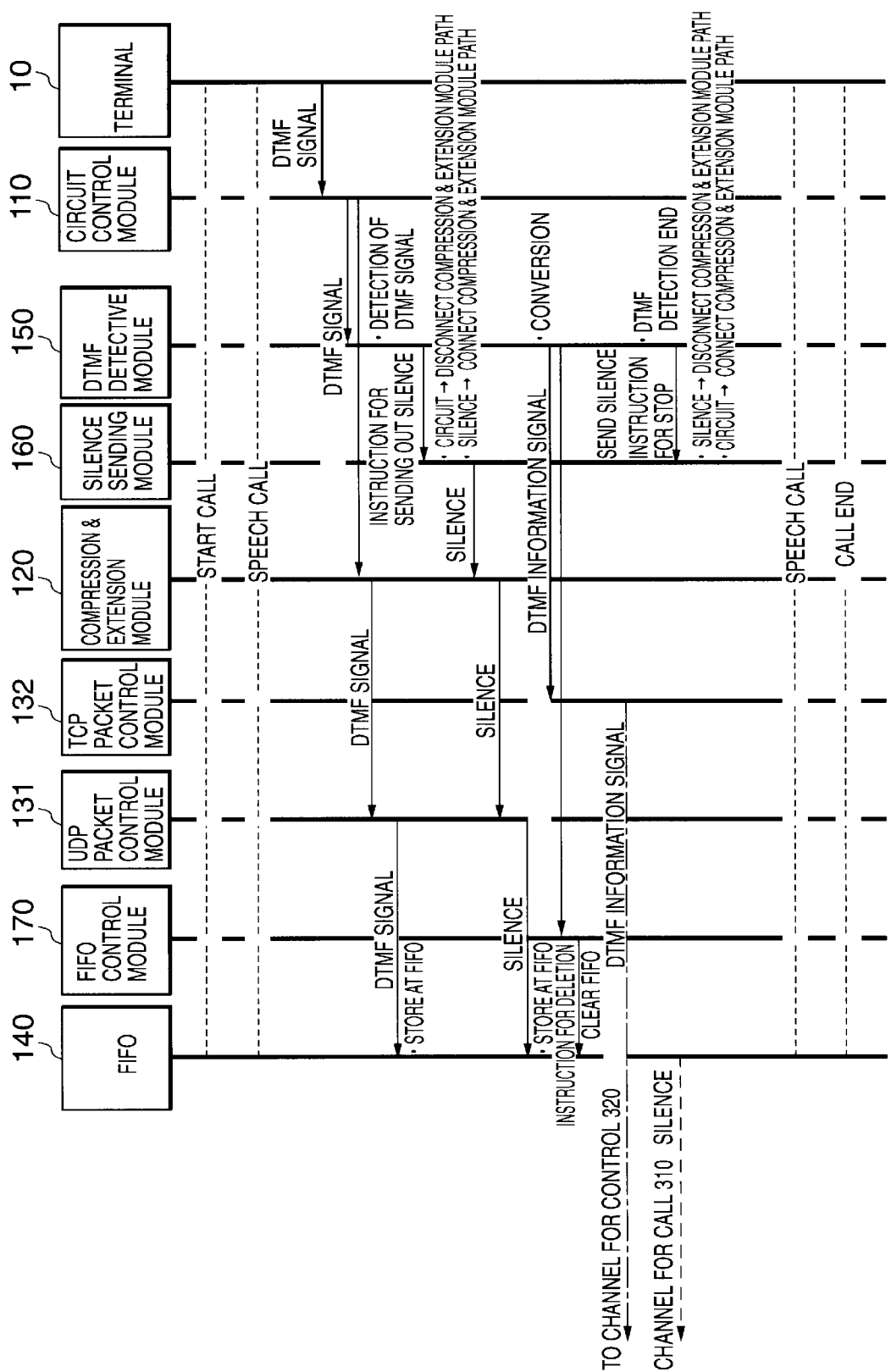
FIG. 3 is a diagram showing a transmission sequence of the first embodiment of the communication apparatus in accordance with the present invention.

Referring now to FIG. 3, a transmitting operation for transferring DTMF signals in the communication apparatus configured as described above will be explained.

The following will describe an operation in a transmission mode.

An analog signal output from the terminal 10 is PCM-coded by the circuit control module 110. The PCM-coded signal is sent out to both the DTMF detective module 150 and the compression and extension module 120.

Regular sound signals are compressed by the compression and extension module 120 and UDP-packeted by the UDP packet control module 131. The UDP-packeted signals are temporarily stored in the FIFO 140, then sent out onto the channel for call 310 after a predetermined time has passed.

The following will describe a case wherein a DTMF signal is sent out from the terminal 10 during a call.

When the DTMF signal is detected by the DTMF detective module 150, an instruction for sending out a silence is issued from the DTMF detective module 150 to the silence sending module 160. The silence sending module 160 that has received the instruction cuts off the channel from the circuit control module 110 to the compression and extension module 120, reads a silence signal from the tone source 190, and connects the channel from the silence sending module 160 to the compression and extension module 120. This operation causes the silence signal to move to the compression and extension module 120. Thereafter, as in the case of regular sound signals, the silence signal is sent out from the compression and extension module 120 to the UDP packet control module 131 wherein it is formed into a UDP packet, stored in the FIFO 140, then sent out onto the channel for call 310.

Further, when the DTMF signal is detected by the DTMF detective module 150 and converted into a DTMF information signal, the DTMF detective module 150 sends out the DTMF information signal to the TCP packet control module 132 and the FIFO control module 170. The DTMF information signal received by the TCP packet control module 132 is formed into a TCP packet before it is sent out onto the channel for control 320.

Upon receipt of the DTMF information signal, the FIFO control module 170 goes back a predetermined time from the moment the DTMF information signal was received, and deletes the signal stored in the FIFO 140. The predetermined time is a time sufficiently long to delete the DTMF signal already stored in the FIFO. This is because the DTMF signal reaches the compression and extension module 120 as a sound signal before it is sent out and reaches the TCP packet control module 132, so that the deletion processing is implemented to prevent the signal from being sent out onto the channel for call 310. The predetermined time is shorter than a time during which data is stored in the FIFO.

When the DTMF detective module 150 finishes detection of the DTMF signal, the DTMF detective module 150 issues an instruction for stopping the sending of a silence to the silence sending module 160. Upon receipt of the instruction, the silence sending module 160 cuts off the channel from the silence sending module 160 to the compression and extension module 120, through which a silence signal of the tone source 190 is passing, and connects the channel from the circuit control module 110 to the compression and extension module 120 instead.

Thereafter, standard sound signal processing is resumed.

Figure 4:
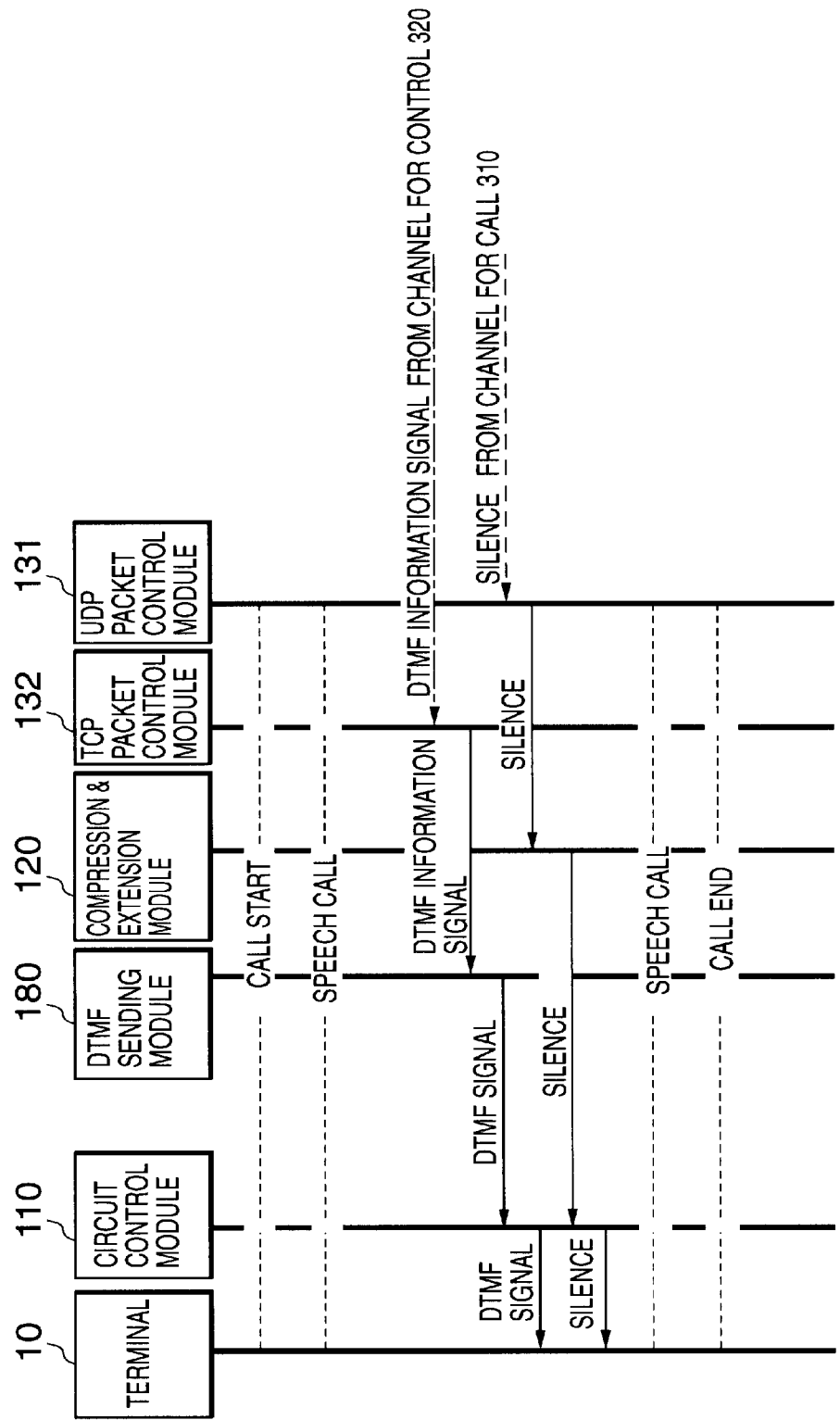
FIG. 4 is a diagram showing a receiving sequence of the first embodiment and a second embodiment of the communication apparatus in accordance with the present invention.

Referring now to FIG. 4, an operation for receiving will be described.

When the TCP packet control module 132 receives a DTMF information signal from the channel for control 320, the DTMF information signal is sent out to the DTMF sending module 180. The DTMF sending module 180 reads a corresponding DTMF signal from the tone source 190, and sends out the DTMF signal to the circuit control module 110. The circuit control module 110 transfers the DTMF signal to the terminal 10.

To transfer the DTMF signals in succession, the aforesaid processing is repeated until all the DTMF signals are transferred.

Regular sound signals, including silence signals, that are sent out onto the channel for call 310 are received by the UDP packet control module 131, restored by the compression and extension module 120, then converted into analog signals by the circuit control module 210 before they are sent out to the terminal 10.

Figure 5:
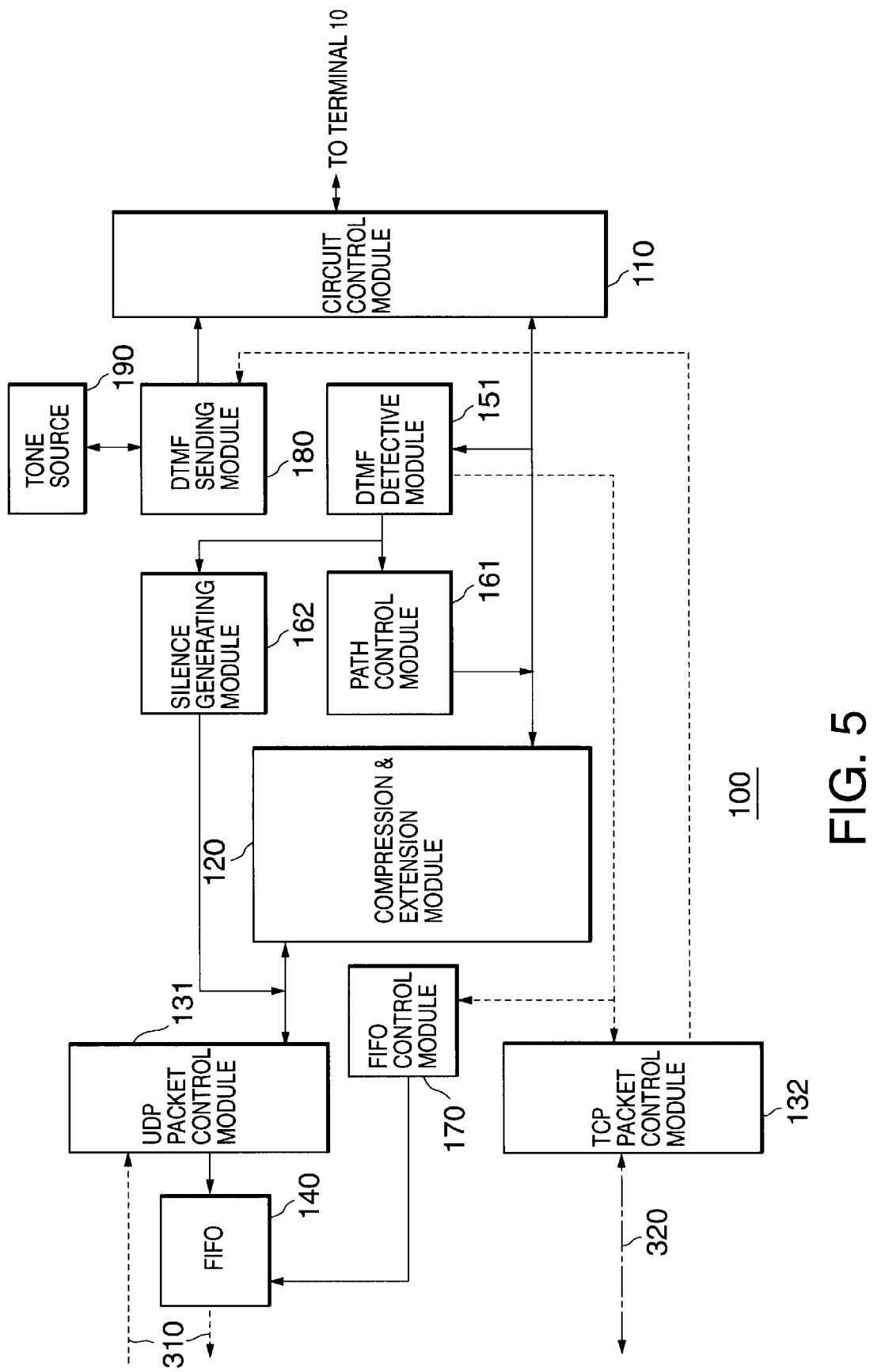
FIG. 5 is a block diagram showing the second embodiment of the communication apparatus in accordance with the present invention.

FIG. 5 shows a configuration of a communication apparatus for transferring DTMF signals, which is a second embodiment in accordance with the present invention.

A communication apparatus 100 shown in FIG. 5 is a VOIP gateway apparatus for transmitting and receiving packeted sound signals. Like reference numerals will be assigned to like components as those of the first embodiment. The following description will be centered on different aspects from those of the first embodiment.

The communication apparatus 100 is formed by a circuit control module 110, a compression and extension module 120, a UDP packet control module 131, a TCP packet control module 132, a first-in-first-out (FIFO) 140, a DTMF detective module 151, a path control module 161, a silence generating module 162, an FIFO control module 170, and a DTMF sending module 180.

When the DTMF detective module 151 detects a DTMF signal, it sends out an instruction signal to the path control module 161 and the silence generating module 162. The DTMF detective module 151 also converts the detected DTMF signal into a DTMF information signal, and sends out the DTMF information signal to the TCP packet control module 132 and the FIFO control module 170.

Upon receipt of the instruction from the DTMF detective module 151, the path control module 161 cuts off a channel from the circuit control module 110 to the compression and extension module 120.

The silence generating module 162 creates a silence signal upon receipt of the instruction signal from the DTMF detective module 150, cuts off a channel from the compression and extension module 120 to the UDP packet control module 131, and connects a channel from the silence generating module 162 to the UDP packet control module 131.

Figure 6:
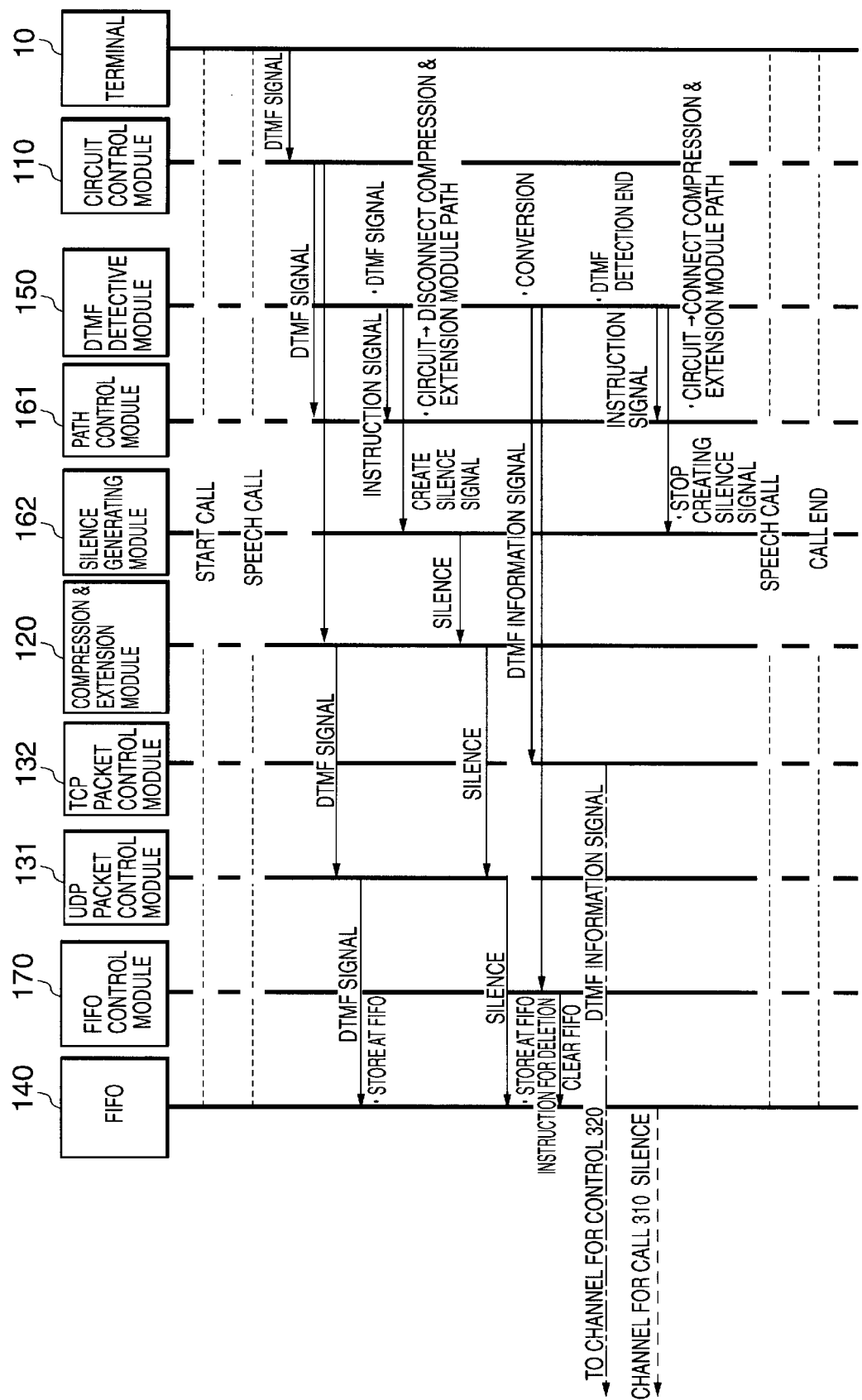
FIG. 6 is a diagram showing a transmitting sequence of the second embodiment of the communication apparatus in accordance with the present invention.

Referring now to FIG. 6, a transmitting operation for transferring DTMF signals in the communication apparatus configured as described above will be explained.

The following will describe an operation in a transmission mode.

The flow of a regular sound signal is identical to that of the first embodiment.

The following will describe a case wherein a DTMF signal is sent out from the terminal 10 during a call.

When a DTMF signal is detected by the DTMF detective module 151, the DTMF detective module 151 sends out an instruction signal to the path control module 161 and the silence generating module 162.

The path control module 161 that has received the instruction signal cuts off a channel from the circuit control module 110 to the compression and extension module 120.

Upon receipt of the instruction signal, the silence generating module 162 creates a silence signal, cuts a channel from the compression and extension module 120 to the UDP packet control module 131, and connects a channel from the silence generating module 162 to the UDP packet control module 131 instead. The created silence signal is a signal that does not require compression. Thus, the silence signal is passed onto the UDP packet control module 131. The operation thereafter is the same as that of the first embodiment.

When the DTMF detective module 151 finishes detection of the DTMF signal, the DTMF detective module 151 sends out an instruction signal to the path control module 161 and the silence generating module 162. Upon receipt of the instruction signal, the path control module 161 connects the channel from the circuit control module 110 to the compression and extension module 120. Upon receipt of the instruction signal, the silence generating module 162 stops creating the silence signal, disconnects the channel from the silence generating module 162 to the UDP packet control module 131, and connects the channel from the compression and extension module 120 to the UDP packet control module 131.

Thereafter, the standard sound signal processing is resumed.

The operation for receiving is the same as that of the first embodiment.

Thus, the second embodiment is configured to send out a silence to the channel for call 310 when a DTMF signal is transferred so as to prevent the DTMF signal from being sent out onto the channel for call 310 as a sound signal.

Furthermore, the second embodiment deletes a DTMF signal stored in the FIFO 140. For this operation, a delay time required for processing in the communication apparatus 100 is taken into account, and the FIFO control module 170 goes back by a predetermined time from the moment the DTMF information signal was received and deletes the DTMF signal. In other words, the embodiment is configured to prevent the DTMF signal, which has been passed as a sound signal to the compression and extension module 120 before the DTMF information signal is received by the FIFO control module 170 after the DTMF signal is sent out from the terminal 10, from being sent out onto the channel for call 310.

The configurations described above allow a DTMF information signal to be transferred on the channel for control 320, while a DTMF signal is prevented from being transferred as a sound signal on the channel for call 310 to a receiver. Hence, dual receiving of a DTMF signal at the receiver can be prevented, thus ensuring reliable transfer of DTMF signals.

The method for transferring DTMF signals according to the embodiment can be applied to a VOIP gateway apparatus as described above, but applications thereof are obviously not limited thereto. The method can be applied to all types of apparatuses adapted to packet and transmit sounds.

In the embodiment, the descriptions have been given of the transfer of DTMF signals, but the embodiment can be also applied to transfer of facsimile answer tone signals by replacing the DTMF detective module by a facsimile answer tone signal detective module.

In the embodiment, the TCP and UDP have been applied for the descriptions, but it is merely an example, and the similar advantages will be obtained with other types of IP.

While particular embodiments of the present invention have been described and illustrated, it should be understood that the invention is not limited thereto since modifications may be made by persons skilled in the art. The present application contemplates any and all modifications that fall within the spirit and scope of the underlying invention described and claimed herein.

What is claimed is:

1. A communication apparatus for sending out a first signal included in an input signal onto a channel for call and sending out a second signal included in said input signal onto a channel for control, comprising:
    a first signal transmitting module that temporarily stores said input signal and transmits said input signal onto said channel for call;
    a second signal transmitting module that transmits a signal supplied to an input terminal onto said channel for control;
    a FIFO control module that deletes said second signal already stored in said first signal transmitting module when a signal is supplied to said input terminal; and
    a signal control module that detects whether said input signal is said second signal or not, transmits a third signal that corresponds to silence to said first signal transmitting module in place of said input signal while detection of said second signal is being implemented, and transmits said second signal to said input terminal when said second signal has been detected.

2. A communication apparatus according to claim 1, wherein said signal control module comprises:
    a signal detective module that detects whether said input signal is said second signal or not, sends out an instruction signal and also transmits said second signal to said second signal transmitting module and said FIFO control module at the same time when said second signal has been detected, and sends out said instruction signal again when detection of said second signal is completed,
    a third signal generating module that generates said third signal that corresponds to a silence; and
    a third signal control module that carries out control so that said third signal is transmitted to said first signal transmitting module in place of said input signal until said instruction signal is received again after said instruction signal is first received.

3. A communication apparatus according to claim 2, wherein,
    said third signal control module cuts off a first channel that leads said input signal to said first signal transmitting module, and connects a second channel to said first signal transmitting module from said third signal generating module to thereby conduct control so that said third signal is transmitted in place of said input signal to said second signal transmitting module.

4. A communication apparatus according to claim 1, wherein,
    said first signal transmitting module comprises:
        a signal compressing module that compresses said input signal and outputs the compressed signal;
        a UDP packet control module that converts said compressed signal into a UDP packet and outputs the UDP packet; and
        a FIFO that stores said UDP packet as said input signal for a predetermined time before transmitting it to said channel for call.

5. A communication apparatus according to claim 1, wherein,
    said second signal transmitting module converts said second signal into a TCP packet and transmits said converted second signal to said channel for control.

6. A communication apparatus according to claim 1, wherein,
    said FIFO control module goes back for a predetermined time from a point where a signal is supplied to said input terminal, and deletes said second signal already stored in said first signal transmitting module.

7. A communication apparatus according to claim 6, wherein,
    said predetermined time means an adequate time that has been set by taking into account a delay time in processing by said communication apparatus and that is sufficiently long to delete said second signal already stored in said first signal transmitting module.

8. A communication apparatus according to claim 6, wherein,
    said predetermined time means a time during which said input signal is sent out from a terminal connected to said communication apparatus and said second signal is supplied to said input terminal.

9. A communication apparatus for sending out a first signal included in an input signal onto a channel for call and sending out a second signal included in said input signal onto a channel for control, comprising:
    a signal compressing module that compresses said input signal and outputs the compressed signal;
    a UDP packet control module that converts said compressed signal into a UDP packet and outputs the UDP packet;
    a FIFO that stores said UDP packet as said input signal for a predetermined time, then transmits said UDP packet to said channel for call;
    a TCP packet control module that converts said second signal into a TCP packet and transmits said converted second signal to said channel for control;
    a FIFO control module that deletes said second signal already stored in said first signal transmitting module when a signal is supplied to said input terminal;

a signal detective module that detects whether said input signal is said second signal or not and sends out an instruction signal and also transmits said second signal to said TCP packet control module and said FIFO control module when said second signal has been detected, and sends out an instruction signal again when the detection of said second signal is completed;

a silence generating module that generates a signal corresponding to a silence; and a silence sending module that carries out control so that said signal corresponding to a silence is transmitted, in place of said input signal, to said signal compressing module until said instruction signal is received again after said instruction signal is received once.

10. A communication apparatus according to claim 9, wherein, said silence sending module cuts off a first channel that leads said input signal to said signal compressing module, and connects a second channel to said signal compressing module from said silence generating module to thereby conduct control so that said signal corresponding to a silence is transmitted in place of said input signal to said signal compressing module.

11. A communication apparatus according to claim 9, wherein, said FIFO control module goes back for a predetermined time from a point where a signal was supplied to said input terminal, and deletes said second signal already stored in said first signal transmitting module.

12. A communication apparatus according to claim 11, wherein, said predetermined time is an adequate time that has been set by taking into account a delay time in processing by said communication apparatus and that is sufficiently long to delete said second signal already stored in said first signal transmitting module.

13. A communication apparatus according to claim 11, wherein, said predetermined time is a time during which said input signal is sent out from a terminal connected to said communication apparatus and said second signal is supplied to said input terminal.

14. A communication apparatus for sending out a first signal included in an input signal onto a channel for call and sending out a second signal included in said input signal onto a channel for control, comprising:

a signal compressing module that compresses said input signal and outputs the compressed signal;

a UDP packet control module that converts said compressed signal into a UDP packet and outputs the UDP packet;

a FIFO that stores said UDP packet as said input signal for a predetermined time, then transmits the UDP packet to said channel for call;

a TCP packet control module that converts said second signal into a TCP packet and transmits said converted second signal to said channel for control;

a FIFO control module that deletes said second signal already stored in said first signal transmitting module when a signal is supplied to said input terminal;

a signal detective module that detects whether said input signal is said second signal or not and sends out an instruction signal and also transmits said second signal to said TCP packet control module and said FIFO control module when said second signal has been detected, and sends out an instruction signal again when the detection of said second signal is completed;

a path control module that cuts off a first channel that leads to said signal compressing module for a period of time from the moment said input signal is received to the moment said instruction signal is received again;

a silence generating module that generates a signal corresponding to a silence; and a silence sending module that transmits a signal corresponding to a silence, in place of the compressed signal, to said UDP packet control module for a period of time from the moment said instruction signal is received to the moment said instruction signal is received again.

15. A communication apparatus according to claim 14, wherein, said silence sending module creates said signal corresponding to a silence, cuts off a second channel that leads to said UDP packet control module from said signal compressing module, and connects a third channel that leads to said UDP packet control module from said silence sending module so as to carry out control to transmit said signal corresponding to a silence to said UDP packet control module in place of said compressed signal.

16. A communication apparatus according to claim 14, wherein, said FIFO control module goes back for a predetermined time from a point where a signal was supplied to said input terminal, and deletes said second signal already stored in said first signal transmitting module.

17. A communication apparatus according to claim 16, wherein, said predetermined time is an adequate time that has been set by taking into account a delay time in processing by said communication apparatus and that is sufficiently long to delete said second signal already stored in said first signal transmitting module.

18. A communication apparatus according to claim 16, wherein, said predetermined time is a time during which said input signal is sent out from a terminal connected to said communication apparatus and said second signal is supplied to said input terminal.

* * * * *